INVENTOR.
Charles S. Lown
BY
Thomas W. Flynn

United States Patent Office 3,450,886
Patented June 17, 1969

3,450,886
APPARATUS AND METHOD FOR MEASURING THE CONCENTRATION OF A SUSPENSION INCLUDING COMPENSATING FOR COLOR BY USING THE MEASUREMENT OF SCATTERED LIGHT TO ELECTRONICALLY INFLUENCE THE VALUE OF DIRECT LIGHT MEASURED
Charles S. Lown, Covington, Va., assignor to Westvaco Corporation, New York, N.Y., a corporation of Delaware
Filed Oct. 26, 1967, Ser. No. 678,301
Int. Cl. G01n 21/26
U.S. Cl. 250—218                                    12 Claims

ABSTRACT OF THE DISCLOSURE

A method and apparatus for measuring the concentration of a pulp slurry, the measurements being independent of suspension liquid color. A light transmission gauge is utilized to measure a direct light and a scattered light with photo sensitive devices. The output of scattered light measuring photo detectors is used to control the gain of an operational amplifier to compensate for suspension liquid color.

Background of the invention

In making paper, it is necessary to control the consistency of wood pulp slurry. Therefore, this consistency must be continuously monitored to determine whether it is within certain defined limits.

One method for determining the slurry consistency is to pass a light beam through a slurry, the light being so passed impinging upon a photo sensitive device. The heavier the concentration, the less light passes through the slurry, and consequently, a reading taken from the photo sensitive device will indicate the slurry concentration. In the past, this method has been implemented utilizing photo resistors, photo diodes, photocells, photo transistors and photo multipliers. The changes in electrical properties of the photo detectors are sensed with additional electrical circuitry and displayed on a meter or strip chart recorder.

It is desirable that the measurement be independent of such parameters as flow rate, suspension water color, and slurry temperature. The instruments currently in use do not have this independence. Several attempts have been made to solve the problem of compensating for suspension water color but none have been completely successful.

Objects of the invention

It is an object of the present invention, therefore, to provide a light transmission gauge which is insensitive to suspension water color.

It is a further object of the invention to provide a light transmission gauge which utilizes the light scattered by the slurry suspension.

Another object of the invention is to compensate for suspension water color by utilizing the scattered light to control the gain of an amplifier.

A still further object is to provide a method for compensating for suspension water color in a light transmission gauge.

And another object of the invention is to provide a method for measuring consistency of a pulp slurry which measurement is independent of suspension water color.

A further object of the invention is to provide a method for monitoring the consistency of a liquid suspension, such measurement being independent of the effects of color of the liquid.

Summary of the invention

The present invention provides a method and apparatus for measuring or monitoring the consistency of a pulp slurry. The apparatus utilizes the principle of the attenuation of a light beam passed through the slurry as an indication of the consistency thereof. In addition to monitoring the light directly passed through the slurry, additional means are provided to measure the scattered light. The scattered light parameter is used to control the gain of an operational amplifier which is used as a compensation circuit for eliminating the effects of suspension water color on the consistency measurement.

Brief description of the drawings

The above and other objects, and features of the invention will become apparent upon reading the following description of the invention, together with the drawings in which.

Detailed description of the drawings

Figure 1:
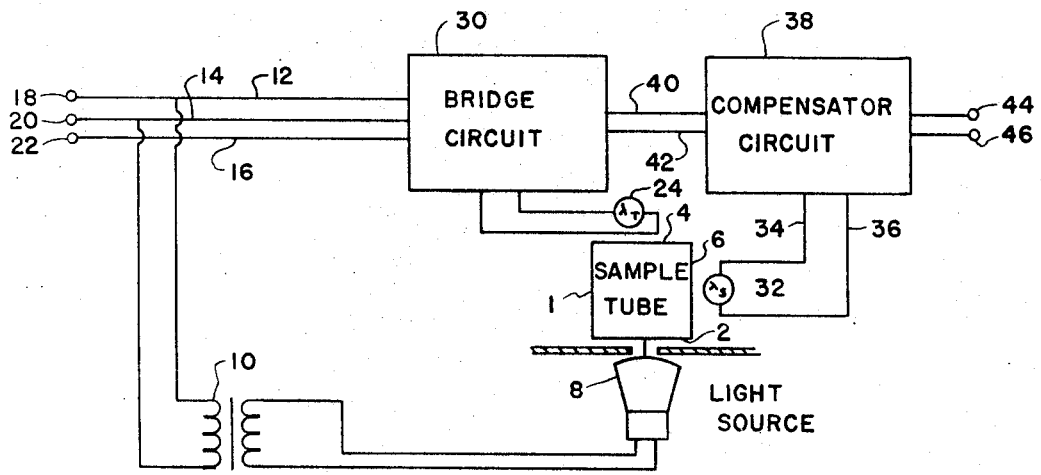
FIGURE 1 is a block diagram showing the overall configuration of the invention.

More specifically, and with reference to FIGURE 1, a sample tube is indicated at 1. Through the sample tube passes the pulp slurry, the concentration of which it is desired to measure. Sample tube 1 is provided with glass windows at 2, 4 and 6. Actually, the windows can completely surround the sample. A light source 8 is provided which light source is controllable in intensity by varying the variable transformer 10. An aperture is included on side 2 so that the light goes through the sample and cannot go around it. The voltage input to the transformer 10 is taken from lines 12 and 14 which are connected to a source of power through terminals 18 and 20. Line 16 and its associated terminal 22 are ground connections for the system.

As the light from source 8, which may be a 150 watt flood light, passes directly through the slurry contained in sample tube 1, an attenuated light beam will impinge upon photo detectors 24. Photo detectors 24 are connected through lines 26 and 28 to a bridge circuit 30, photo detectors 24 forming one leg thereof. The bridge circuit itself will be discussed with reference to FIGURE 2.

In addition to the direct light, the presence of a suspension in the slurry will cause some of the light from source 8 to be scattered, such light falling on photo detectors 32 located at 90° from the direct beam. Photo detectors 32 are connected through lines 34 and 36 to a compensator circuit 38 which will be discussed later in connection with FIGURE 3. The output of bridge circuit 30 is carried on lines 40 and 42 to the input of the compensator circuit, and the output of the compensator circuit at terminals 44 and 46 is representative of the consistency of the pulp slurry, compensated for the color of the suspension liquid.

As will be discussed below the photo detectors, to derive an electrical signal, are illustrated as photo resistors. However, it should be understood that photo diodes, photo cells, photo transistors, photo multipliers, photo voltaic cells and the like could be used with their appropriate circuitry.

Figure 2:
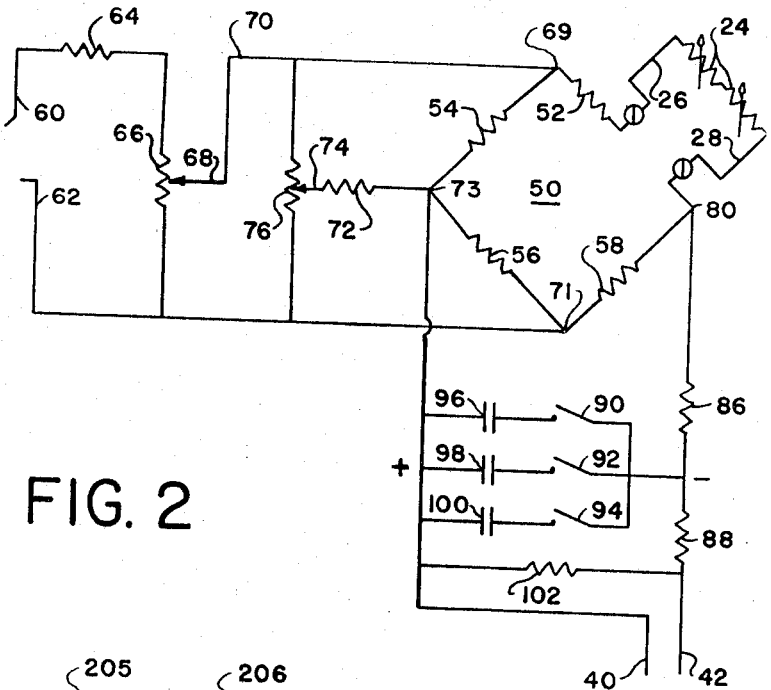
FIGURE 2 is a schematic diagram showing the components of the bridge circuit.

Referring now to FIGURE 2, a bridge circuit is shown generally at 30. One leg of the bridge circuit is made up of a series connection of two photo resistors 24, corresponding to the direct light sensing photo detectors in FIGURE 1. Also, in the same leg of the bridge circuit is resistor 52. A second leg of the bridge circuit 50 consists of resistor 54, a third leg resistor 56, and a fourth leg resistor 58.

A voltage is obtained from a power supply (not shown) with this voltage appearing on lines 60 and 62. A resistor 64 is located in series with line 60. A voltage divider 66, resistor 66 being variable, is used to control the range of sensitivity of the bridge. The resistors 64 and 66 are in a series connection between lines 60 and 62. A wiper 68 associated with variable resistor 66 is connected to a line 70 which in turn is connected to a junction 69 between resistors 52 and 54 of bridge circuit 50. Line 62 is connected directly to a junction 71 between resistors 56 and 58, which comprise two of the legs of bridge circuit 50. A current limiting resistor 72 is connected to a junction 73 between resistors 54 and 56, the other side of resistor 72 being connected to a wiper 74 of variable resistor 76 which is connected between lines 70 and 62. Resistor 76 acts to zero the bridge circuit before measurements are begun.

The output of bridge 50 is taken from a pair of junction points 73 and 80 at the junctions between resistors 54, 56 and 58 and photo resistors 24 respectively. The output is carried along lines 40 and 42. A pair of resistors 86 and 88 are provided in a series circuit in line 42. The junction between resistors 86 and 88 is connected to a plurality of switches 90, 92 and 94, each switch being associated with a series capacitor 96, 98 and 100 respectively, the three capacitors being themselves in a parallel configuration. The other side of capacitors 96, 98 and 100 are connected to line 40 at a common point. Still another resistor, 102, is provided between lines 40 and 42. The resistor-capacitor circiut above described performs a damping function on the output on bridge circuit 50.

The damping circuit is used to average the waviness caused by non-uniform suspension, i.e., the variance in size of the material in suspension. It is also used to selectively damp noise which is proportional to the flocculation in the sample. The switches may be opened if no noise damping is desired or selectively closed depending upon the degree of damping desired.

Figure 3:
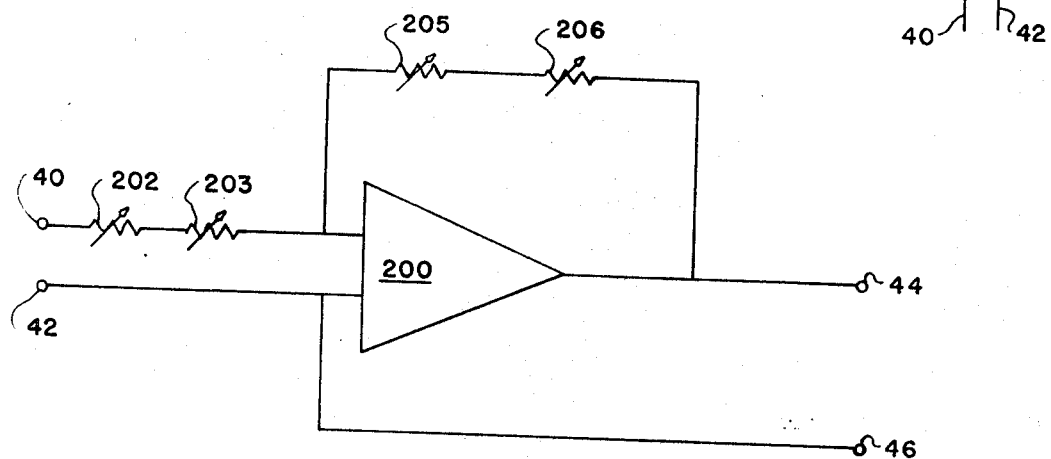
FIGURE 3 is a schematic of the compensation portion of the invention.

Turning now to FIGURE 3, an operational amplifier is shown at 200. The output of the bridge circuit 30 provides the input on lines 40 and 42 to the operational amplifier 200. Input line 40 has connected in series therewith an input resistor 202 and one of the scattered light photo resistors 203 as shown in FIGURE 1. The output of amplifier 200 appears at terminals 44 and 46 as discussed above. Connected between the output and the input of amplifier 200 is provided a second photo resistor 205 and in series therewith a resistor 206, the photo resistor 205 and resistor 206 being in feedback relation to the amplifier. The amplifier circuitry is conventional, and provided as a part thereof are conventional trimming and balancing controls normally associated with an operational amplifier. The photo resistors 203 and 205 correspond to element 32 in FIGURE 1.

*Operation of the bridge circuit*

The bridge circuit of FIGURE 2 operates as follows:

A voltage of approximately 24 volts DC is provided at input terminals 60 and 62. This voltage is applied, through voltage divider 66 to the junctions 67, 69 of the bridge circuit 30. With the remainder of the circuitry operating under standard conditions including the sample in sample tube 1 (of FIGURE 1) being a completely clear liquid, photo resistors 24 will receive a certain amount of light depending upon the intensity of light source 8 (again of FIGURE 1). Under these conditions, the bridge circuit is "zeroed" by adjusting wiper 74 of resistor 76 until no output voltage appears on lines 40, 42.

With the intensity of light source 8 remaining at the condition established above, the pulp slurry, the consistency of which it is desired to measure, is introduced into sample tube 1. The presence of the pulp slurry will attentuate the light beam impinging on photo resistors 24, thus increasing the resistance of said photo resistors, resulting in an unbalanced condition in the bridge. This imbalance in the bridge will cause a current or voltage to appear on lines 40 and 42, the output lines of the bridge circuit.

*Operation of compensator circuit*

It has been found that pulp concentration not only affects the intensity of the directly transmitted light, but it also affects the amount of light scattered by the pulp slurry. Tests were conducted to determine the effect of pulp concentration (with constant suspension water color) and suspension water color (at a constant pulp concentration). The photo-detector arrangement was substantially as shown in FIGURE 1 (i.e., a light source shining through a pulp sample, the beam impinging upon photocells directly opposite the light source, and additionally, a pair of photo detectors at a 90° angle to the beam).

Figure 4:
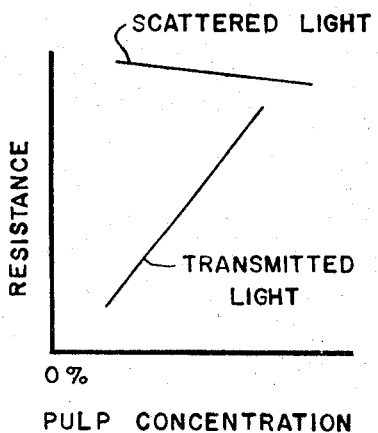
FIGURE 4 is a graph illustrating resistance vs. pulp concentration.
Figure 5:
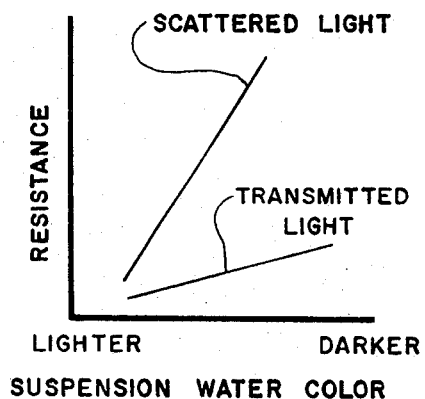
FIGURE 5 is a graph illustrating resistance vs. suspension water color.

The results of these tests as illustrated in FIGURES 4 and 5 showed that:

(1) The resistance of the transmitted light photo-resistors increased both with an increase in pulp concentration and a darkening of suspension water color, and (2) The resistance of the scattered light photo-resistors decreased with an increase in pulp concentration and increased with a darkening of suspension water color.

Of important significance, as illustrated in the tests and discussion thereof, is that the transmitted light is affected primarily by the pulp concentration and the scattered light by the color of the water suspension.

These results showed that a proper arrangement of these photo resistors could lessen or eliminate the effect of suspension water color upon light transmission gauge output. The compensation circuit as shown in FIGURE 3 was developed and found effective.

The gain of an operational amplifier is given by $$\frac{E_o}{E_i} = -\frac{R_f}{R_i}$$

Where $E_i$ is the input voltage; $E_o$ is the output voltage. $R_f$ is the feedback resistance and $R_i$ is the output resistance. This gain may be changed, therefore, by changing either $R_f$ or $R_i$ or both.

In the circuit shown in FIGURE 3, photo resistors 203 and 205 are the scattered light photo resistors shown in FIGURE 1. The gain of this circuit is given by $$G = -\frac{205 + 206}{203 + 202}$$

Therefore, if 206 equals 202 and 203 equals 205, the gain is unity. If 206 does not equal 202 and 203 equals 205, the gain will change as the values of 203 and 205 change depending upon the amount of scattered light.

Since, as stated above, of utmost importance the resistance of the scattered light resistors decreased with an increase in pulp concentration and increased with a darkening of suspension water color, and the resistance of the transmitted photo resistors increased both with an increase in pulp concentration and a darkening of suspension water color, if resistor 206 is made larger than resistor 202, as the suspension color increases the gain will decrease. And since with a suspension color increase the resistance of the direct photo resistors increases, the gain decrease from the compensator will offset the increase due to the darkening of the suspension color. Likewise, since with an increase in the suspension concentration, the gain of the compensator would tend to increase, and the result due to the resistance of the direct light sensing photo resistors' increase would be still another signal increase, the device would then compensate for changes in suspension color. It is easy to show that the opposite is also true.

Operation of the overall system

The operation of the entire system is as follows:

A pulp slurry sample is introduced into the sample tube 1 and a light from light source 8 is passed through the sample. A portion of the light beam, somewhat attenuated, impinges upon photo resistors 24 as directly sensed light, and a portion of the light is scattered by the slurry and impinges on photo resistors 32.

The direct sensing photo resistors 24 comprise one leg of a bridge circuit 30. As the resistance of the photoresistors changes, due to either an increase in slurry concentration or a darkening of suspension liquid, the bridge becomes unbalanced and a voltage appears at its output.

The output of the bridge circuit 30 is fed to a compensator circuit 38 in which the output from the bridge is compensated to eliminate the effects of suspension liquid color. The compensation is accomplished by utilizing the output from the scattered light sensing photoresistors 32, to control the gain of an operational amplifier in such a way as to negate the effects of suspension water color as discussed above.

While the above description is illustrative of a preferred embodiment of my invention it is obvious that many modifications and alterations will become apparent to those skilled in the art. Therefore, I do not mean to be limited by the above description, but only by the scope of the claims appended hereto including those equivalents of which practitioners in the art would be aware.

I claim:

1. A method of measuring the concentration of a suspension with varying color comprising:
    (a) passing a light beam through the suspension,
    (b) sensing the light passing directly through the suspension,
    (c) sensing the light scattered by the suspension,
    (d) utilizing the measurement of the scattered light to electronically change the sensed value of the direct light, thereby compensating for color of the suspension.

2. A method as set forth in claim 1 wherein electronically changing the sensed value of the direct light comprises:
    (a) deriving a first electrical parameter proportional to the said direct light,
    (b) deriving a second electrical parameter proportional to said scattered light,
    (c) applying said first proportional parameter to the input of an amplifier, and
    (d) applying said second proportional parameter between the output and input of said amplifier.

3. A method as set forth in claim 2 wherein said first parameter is a voltage and said second parameter is an impedance.

4. A method as set forth in claim 2 wherein:
    (a) said electrical parameter proportional to said direct light is derived by providing an impedance proportional to direct light in a bridge circuit, and
    (b) measuring the imbalance in said bridge circuit to obtain a voltage proportional thereto.

5. A device for measuring the concentration of a suspension comprising:
    (a) a light source,
    (b) a sample of said suspension,
    (c) means for passing light from said light source through said sample,
    (d) means for measuring the light passing directly through said sample and deriving a first electrical parameter proportional thereto,
    (e) means for measuring the light scattered by said sample and deriving a second electrical parameter proportional thereto, and
    (f) means utilizing said second electrical parameter proportional to said scattered light to electronically change the value of said first electrical parameter as a function of the value of the second electrical parameter proportional to said scattered light.

6. A device as set forth in claim 5 wherein said first electrical parameter is a voltage and said second electrical parameter is an impedance.

7. A device as set forth in claim 6 further comprising:
    (a) an amplifier,
    (b) means for applying said voltage proportional to said direct light to said amplifier, and
    (c) means for connecting said impedance proportional to said scattered light to said amplifier.

8. A device as set forth in claim 7 wherein:
    (a) said voltage proportional to said direct light is applied as an input to said amplifier, and
    (b) said impedance proportional to said scattered light is applied as a feedback impedance to said amplifier.

9. A device as set forth in claim 5 further comprising:
    (a) a bridge circuit having a pair of input terminals and a pair of output terminals and a plurality of legs,
    (b) said direct light measuring means comprising one leg of said bridge circuit.

10. A device as set forth in claim 9 further comprising:
    (a) an amplifier having an input and an output,
    (b) means for connecting said output terminals from said bridge circuit as an input to said amplifier, and
    (c) means including said second electrical parameter proportional to said scattered light, for connecting said amplifier output to said amplifier input as a feedback loop therebetween.

11. A device as set forth in claim 6 further comprising:
    (a) an amplifier having an input and an output,
    (b) means for applying said voltage proportional to said direct light to said amplifier input, and
    (c) means including said impedance proportional to said scattered light, for connecting said amplifier output to said amplifier input as a feedback loop therefor.

12. A device as set forth in claim 5 wherein said means for measuring are photo resistors.

References Cited

UNITED STATES PATENTS

| | | | |
|---|---|---|---|
| 1,905,251 | 4/1933 | Styer | 250—218 |
| 2,873,644 | 2/1959 | Kremen et al. | 250—218 |
| 3,358,148 | 12/1967 | Conklin et al. | 250—218 |
| 3,379,991 | 4/1968 | Clerr et al. | 250—214 |

WALTER STOLWEIN, *Primary Examiner.*

MARTIN ABRAMSON, *Assistant Examiner.*

U.S. Cl. X.R.

88—14; 250—214